(12) United States Patent
Birch et al.

(10) Patent No.: US 9,167,660 B2
(45) Date of Patent: Oct. 20, 2015

(54) COMBINED SURFACE MOUNT AND IN-WALL MOUNT DIMMER

(71) Applicant: Armacost Lighting, LLC, Baltimore, MD (US)

(72) Inventors: Philip W. Birch, Pasadena, MD (US); Stephen C. Novak, Perry Hall, MD (US); Terry A. Armacost, Pasadena, MD (US)

(73) Assignee: Armacost Lighting, LLC, Baltimore, MD (US)

( * ) Notice: Subject to any disclaimer, the term of this patent is extended or adjusted under 35 U.S.C. 154(b) by 219 days.

(21) Appl. No.: 13/864,615

(22) Filed: Apr. 17, 2013

(65) Prior Publication Data

US 2013/0278174 A1   Oct. 24, 2013

Related U.S. Application Data

(60) Provisional application No. 61/625,971, filed on Apr. 18, 2012.

(51) Int. Cl.
| | |
|---|---|
| *H05B 37/00* | (2006.01) |
| *H01H 11/00* | (2006.01) |
| *H02G 3/14* | (2006.01) |
| *H02G 3/10* | (2006.01) |
| *H02G 3/12* | (2006.01) |

(52) U.S. Cl.
CPC .............. *H05B 37/00* (2013.01); *H01H 11/00* (2013.01); *H02G 3/14* (2013.01); *H02G 3/10* (2013.01); *H02G 3/12* (2013.01); *Y10T 29/49105* (2015.01)

(58) Field of Classification Search
USPC ................................................. 315/291–311
See application file for complete search history.

(56) References Cited

U.S. PATENT DOCUMENTS

| | | | | | |
|---|---|---|---|---|---|
| 5,699,221 | A | * | 12/1997 | O'Leary et al. ............... | 361/160 |
| 6,774,308 | B1 | * | 8/2004 | Troyen ............................ | 174/63 |
| 7,809,963 | B2 | * | 10/2010 | Dorn ............................. | 713/300 |
| 2008/0151458 | A1 | * | 6/2008 | Beland et al. ................. | 361/114 |
| 2011/0301776 | A1 | * | 12/2011 | Goyal et al. .................. | 700/296 |

* cited by examiner

*Primary Examiner* — Brandon S Cole
(74) *Attorney, Agent, or Firm* — Lowe Hauptman & Ham, LLP

(57) ABSTRACT

A lighting dimmer for surface mount or in-wall mount comprising: a lighting dimmer main body, the main body comprising: a lighting control board positioned in the main body for controlling one or more light emitting diode based light sources; a surface mount attachment connected to the main body for facilitating surface mount connection of the lighting dimmer; a controller connected to the lighting control board and configured to input a command to the lighting control board, and; a surface portion configured to receive an insert for in-wall mounting of the lighting dimmer.

11 Claims, 14 Drawing Sheets

END VIEW
outside

COMBINED SURFACE MOUNT AND IN-WALL MOUNT DIMMER

RELATED APPLICATIONS

The present application is a non-provisional utility application based on, and claims priority to prior provisional application Ser. No. 61/625,971, filed Apr. 18, 2012, and of which is hereby incorporated herein by reference in its entirety.

BACKGROUND

There are many LED dimming devices available. Up until now, consumers had a choice between three configurations: In-wall; In-line; or Surface mount.

Our research has shown that surface mount dimmers are the most popular because it allows the consumer to mount their dimmer wherever they want direct control of their LED lighting. However, in-wall mounting was preferred over professionals and DIY types.

Current configurations of LED dimmers include surface mount dimmers which are too large to mount in a standard United States electrical box and cannot be used in-wall.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
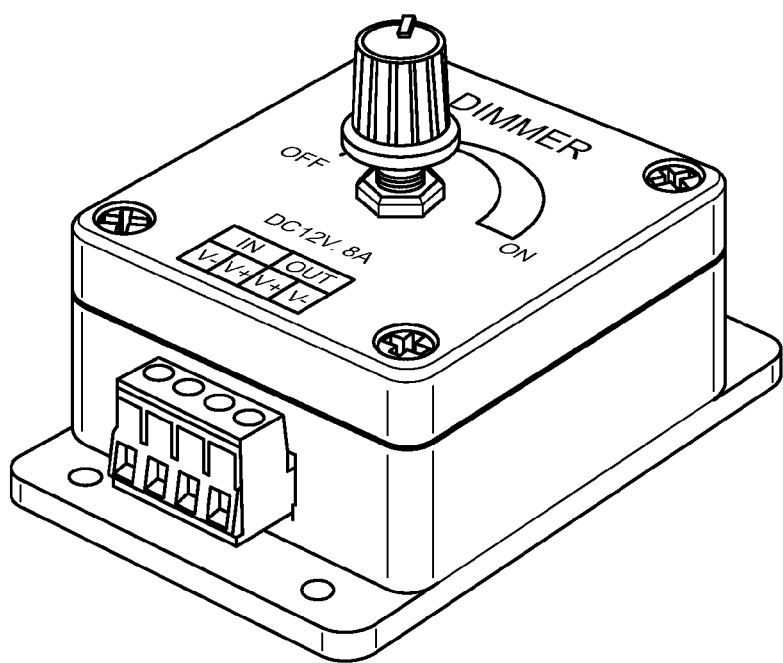
FIG. 1 is an image of a conventional dimmer.

FIG. 1 is an image of a conventional dimmer for use with light emitting diode (LED) based illuminants, e.g., light bulbs or other similar light sources. The conventional dimmer is a surface mount dimmer which is too large to mount in a standard United States electrical box and thus for at least this reason cannot be used in-wall. In at least some embodiments, the standard US electrical box is a box for receiving a single electrical switch.

There are various NEMA ratings depending on the enclosure used. At least one of the disclosed embodiments of the switch fits in a common low voltage electrical box NEMA OS-2, which is smaller than a typical switch electrical box. But in at least one other embodiment, the dimmer fits into standard electrical boxes for different voltages, e.g., alternating current (AC) or direct current (DC) low voltage. In at least some other embodiments, the disclosed dimmer is configured for use within and/or in conjunction with at least an Underwriters Laboratories (UL) listed AC electrical box.

Through thoughtful design, the present inventors have created a fully functional, yet smaller dimmer that allows for more discreet surface mount installations yet can be installed in any standard US electrical box, including the smaller boxes made specifically for low voltage class 2 circuits. To the inventors' knowledge, there is no dimmer switch available that can function both in-wall and as a surface mount device.

Figure 2:
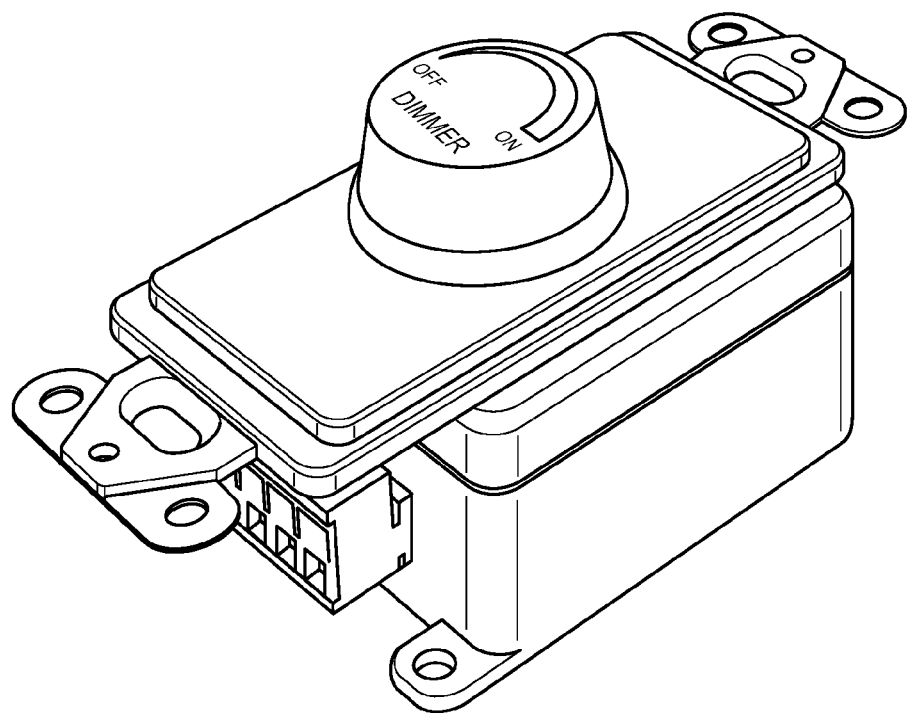
FIG. 2 is a lighting dimmer according to an embodiment.

FIG. 2 is a perspective view of a lighting dimmer according to an embodiment. The lighting dimmer has a smaller profile and includes a standard designer-style insert plate that fits into a recess dimmer case for alignment when used as an in wall dimmer. The lighting dimmer works with a standard switch plate and/or electrical box.

Figure 3:
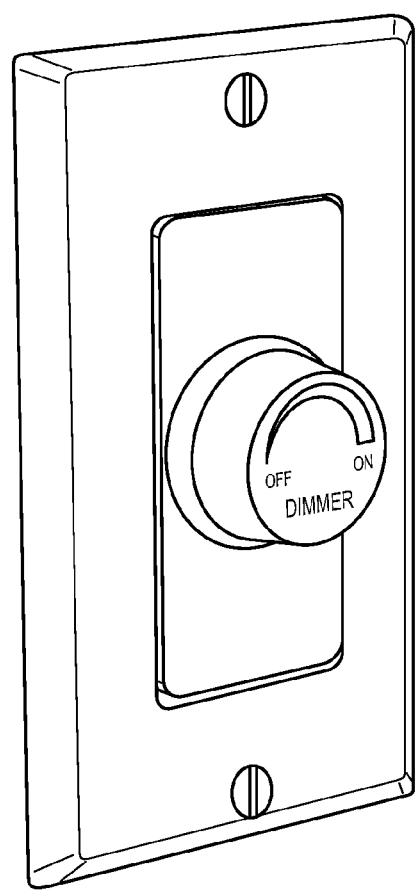
FIG. 3 is a lighting dimmer in wall according to an embodiment.

FIG. 3 is an in-wall configuration of a lighting dimmer according to an embodiment. The lighting dimmer includes a standard switch plate positioned over at least a portion of the face of the dimmer. The standard switch plate fits over the above-mentioned standard designer-style insert plate.

Figure 4:
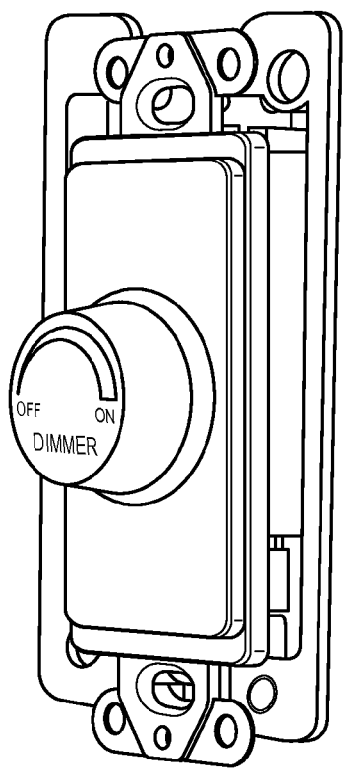
FIG. 4 is a lighting dimmer in a standard low voltage electrical box according to an embodiment.

FIG. 4 is a lighting dimmer according to an embodiment installed in a standard low voltage electrical box. The lighting dimmer is pictured without the standard switch plate positioned over the face of the dimmer.

Figure 5:
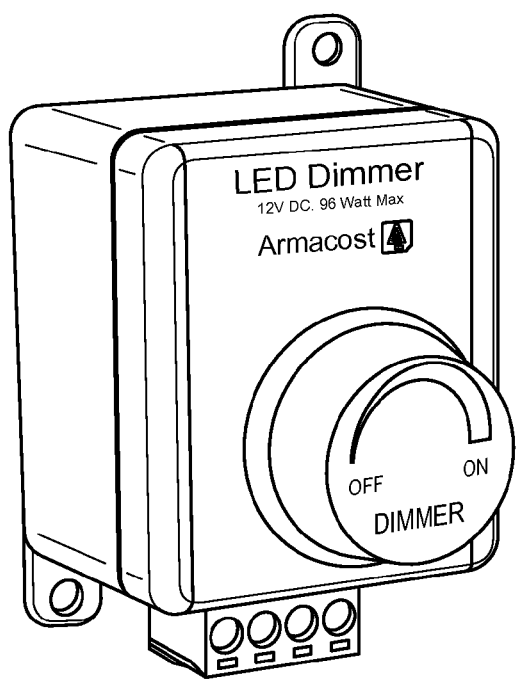
FIG. 5 is a lighting dimmer in a surface mount configuration according to an embodiment.

FIG. 5 a lighting dimmer according to an embodiment in a surface mount configuration. Two tabs, one positioned on the upper right corner and one on the lower left corner, are visible and usable to attach the lighting dimmer to a wall or support bracket or beam. Screws, nails, or other suitable connectors are usable in various embodiments to mount the lighting dimmer in the surface mount configuration. The lighting dimmer of FIG. 5 has a recessed surface on the front to hold a Decora style insert plate in place. In order to reconfigure the lighting dimmer, the control knob is removed, the Decora style insert plate is removed, and the knob is reinstalled.

This low voltage, 12V DC device employs a micro-built PCB board utilizing pulse-width modulation (PWM) for controlling power to LEDs. PWM is used to achieve various LED intensity levels and to obtain more linear control of light output compared to other dimming methods.

Benefits of technology:

Excellent performance: no flickering, humming, or jumping

Provides smooth, full range 0-100% dimming

Reduces energy and extends even longer the life of LEDs

Rated at 8A, 96 watts for use with larger LED arrays

Fits directly into any standard wall switch box to match designer-style switches and wall plates, or Surface mount any place where you want direct control of your LED lighting Easy rotary function and small profile allows for use in discreet locations Excellent performance with little or no flicker at the low-end of the dimming range Wide range DC input (12-24V) allows for a variety of uses including Solar, Auto/RV and Marine applications.

The device, as it stands now is a single channel LED dimmer. However, in other embodiments, the lighting dimmer is a 3-channel dimmer to also control RGB color changing LED lights. In still further embodiments, the lighting dimmer is a "touch" dimmer which lacks the knob of the FIG. 5 embodiment and is instead responsive to the touch of a user.

In at least some other embodiments, the lighting dimmer comprises a radio frequency (RF) or infrared (IR) receiver to allow wireless remote control as well as controlled at the wall, or wherever the dimmer is mounted.

Figure 6:
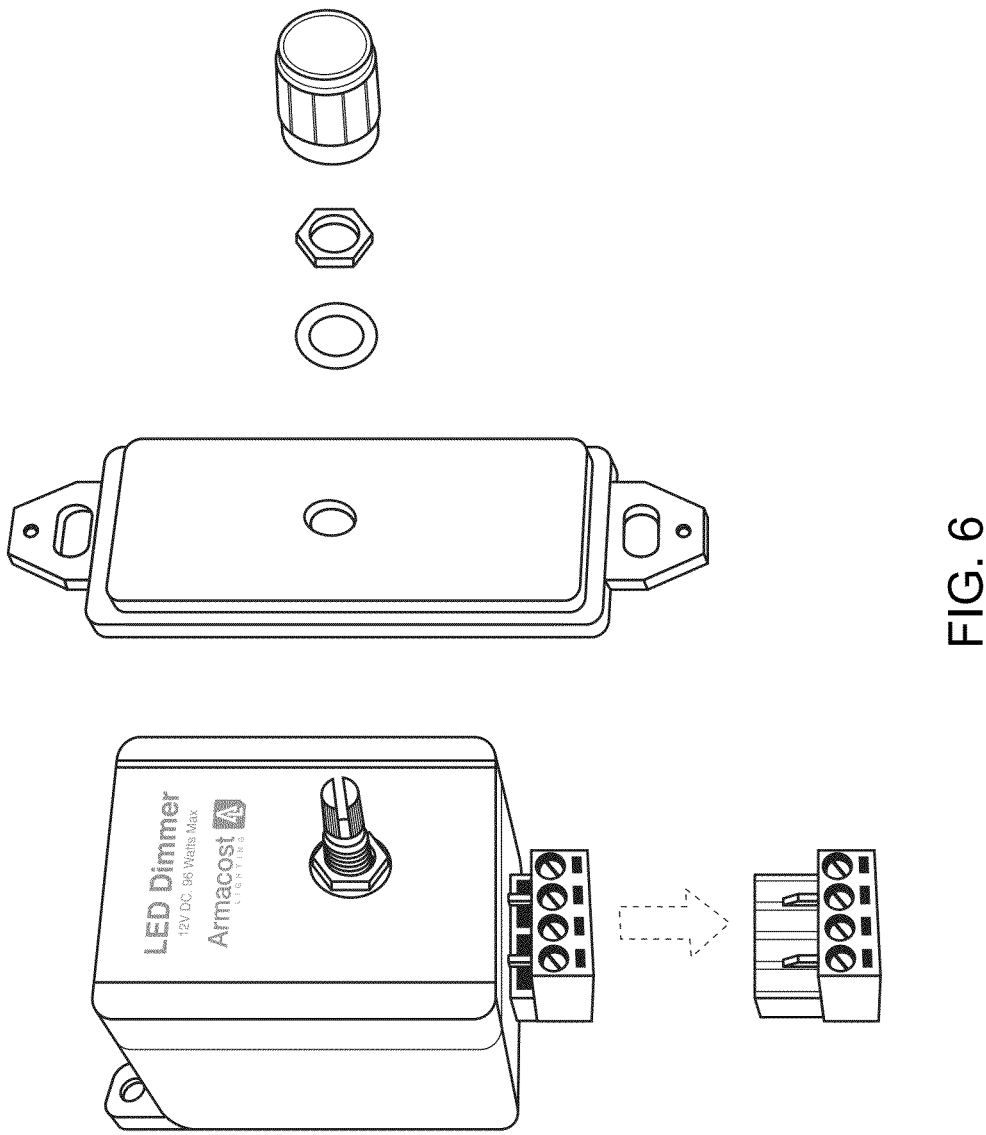
FIG. 6 is an exploded parts view diagram of a lighting dimmer according to an embodiment.

FIG. 6 is an exploded parts view diagram of a lighting dimmer according to an embodiment. Depicted in FIG. 6 are the lighting dimmer main body with electronic circuitry inside, a rotary shaft for input of dimmer control commands, one of a pair of tabs for surface mount of the dimmer, and a connected wiring connector. Depicted in FIG. 6 in spaced relation from the lighting dimmer main body is a decora style insert for placement on the main body and defining an opening through which the rotary shaft extends. Next to the insert are a washer, nut, and knob for placement on the rotary shaft. The washer and nut act to retain the insert on the face of the main body and the knob facilitates user manipulation of the rotary shaft to control the lighting level.

Figure 7:
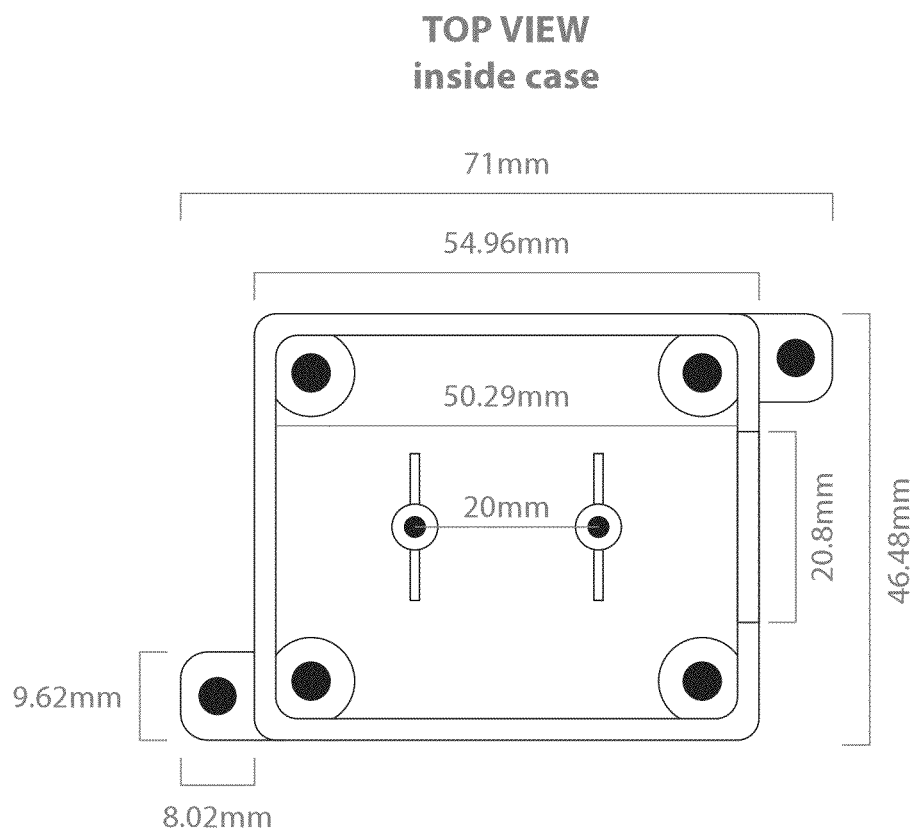
FIG. 7 is a top view of the main body (case) of a lighting dimmer according to an embodiment.

FIG. 7 is a top view of the main body (also referred to as the case) of a lighting dimmer according to an embodiment. As depicted the main body is sized to fit within the boundaries of a standard low voltage wall box having dimensions of 48 mm wide by 75 mm tall. In the FIG. 7 embodiment, the pair of surface mount mounting tabs are positioned on the lower left and upper right sides of the main body. In at least some embodiments, the mounting tabs are positioned on different portions of the main body. In still further embodiments, the mounting tabs are positioned on more or less than two sides of the main body. Two openings are defined along a centerline of the main body for additional mounting options for the lighting dimmer.

Figure 8:
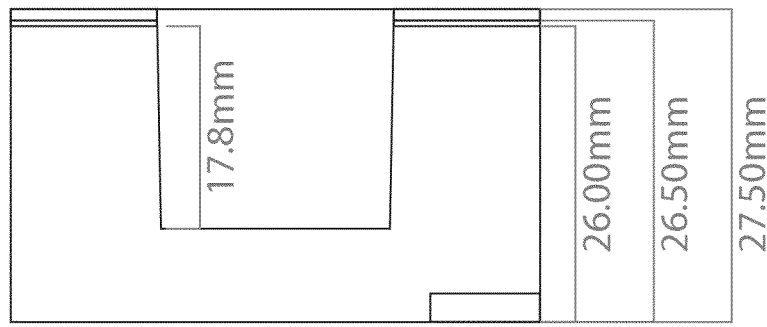
FIG. 8 is an end view of the main body of the lighting dimmer of FIG. 7.
Figure 9:
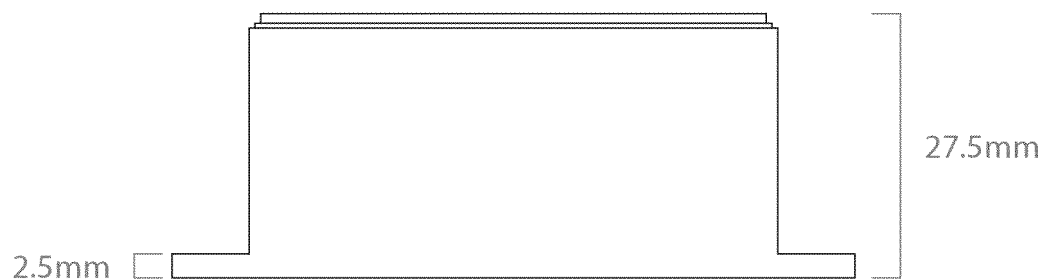
FIG. 9 is a side view of the main body of the lighting dimmer of FIG. 7.

FIG. 8 is an end view of the main body of the lighting dimmer of FIG. 7. FIG. 9 is a side view of the main body of the lighting dimmer of FIG. 7.

Figure 10:
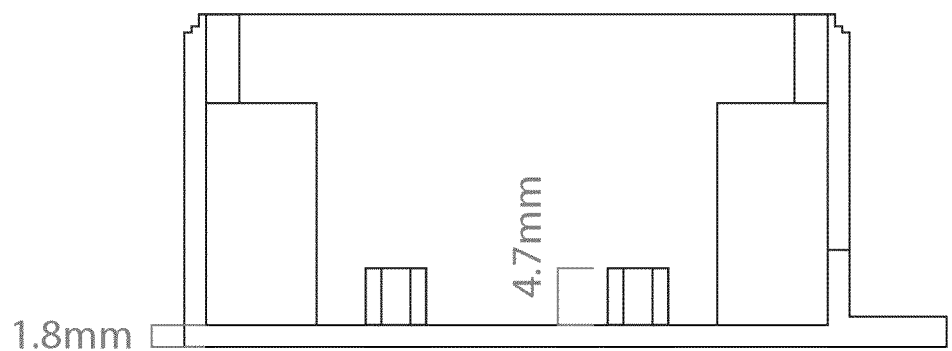
FIG. 10 is a cross section view of the main body of the lighting dimmer of FIG. 7.

FIG. 10 is a cross section view of the main body of the lighting dimmer of FIG. 7. The two defined openings along the centerline of the main body are visible toward the middle of the lighting dimmer.

Figure 11:
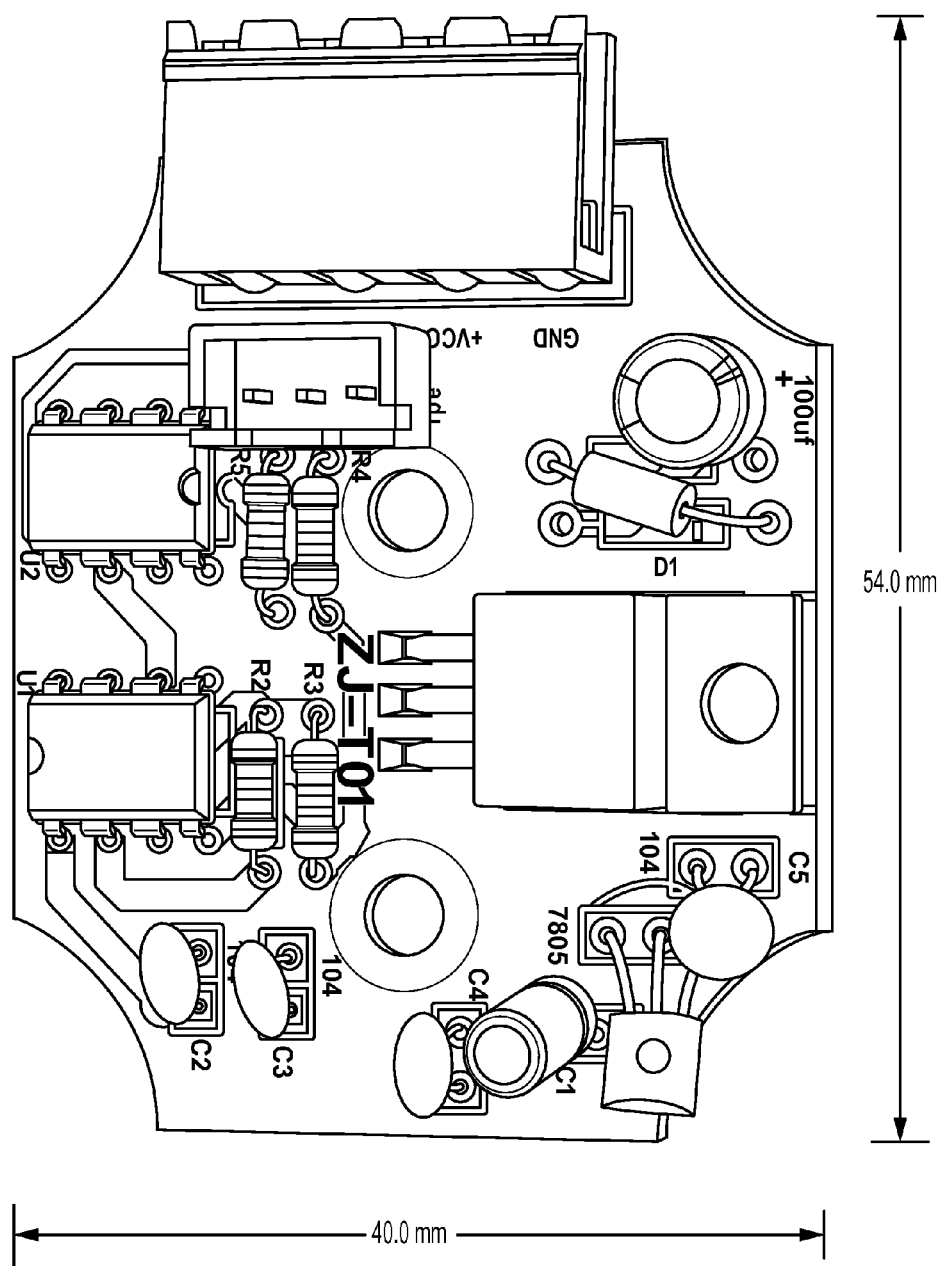
FIG. 11 is a top view of a circuit board for a lighting dimmer according to an embodiment.
Figure 12:
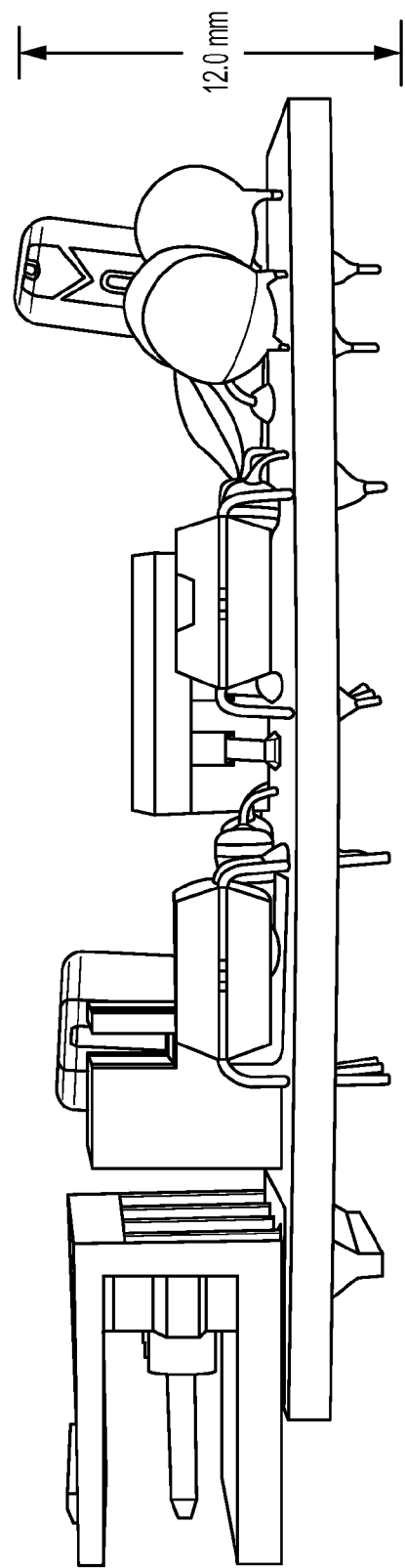
FIG. 12 is a side view of the circuit board of FIG. 11.
Figure 13:
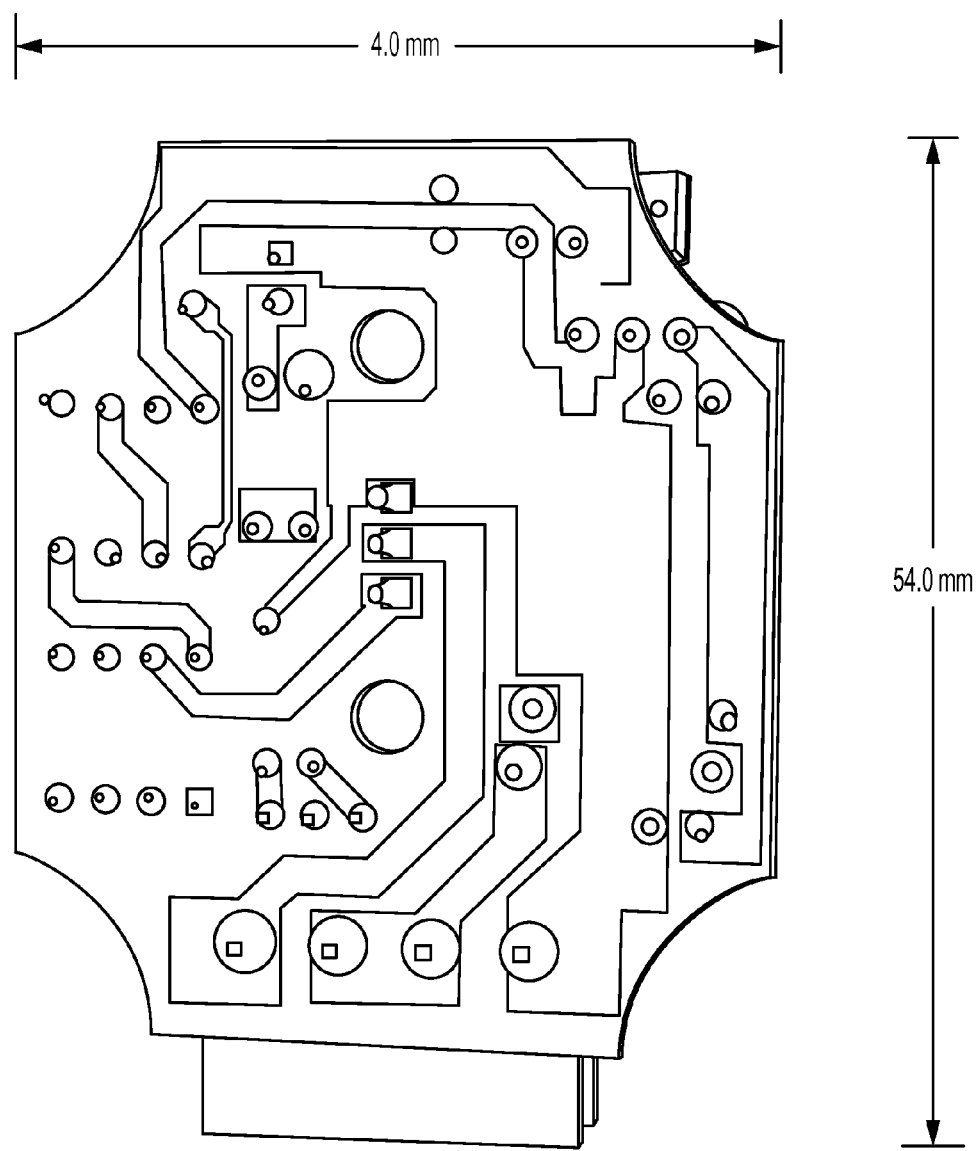
FIG. 13 is a bottom view of the circuit board of FIG. 11.
Figure 14:
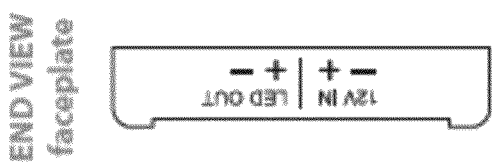
FIG. 14 is a top and end view of a lighting dimmer according to another embodiment.
Figure 14:
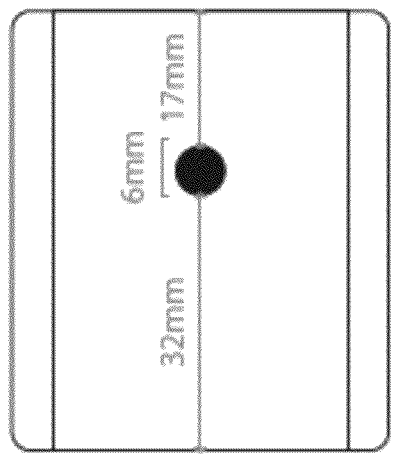
Figure 14:
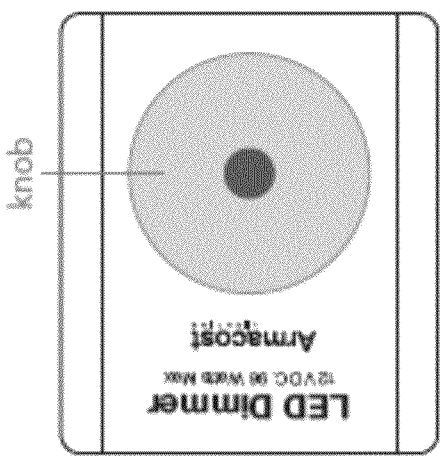

FIG. 11 is a top view of a circuit board for a lighting dimmer according to an embodiment. FIG. 12 is a side view of the circuit board of FIG. 11. FIG. 13 is a bottom view of the circuit board of FIG. 11. FIG. 14 is a top and end view of a lighting dimmer according to another embodiment.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A lighting dimmer comprising:
   a lighting dimmer main body configured to be capable of surface or in-wall mounting, the main body comprising:
   a lighting control board positioned in the main body for controlling one or more light emitting diode based light sources;
   a surface mount attachment connected to the main body for facilitating surface mount connection of the lighting dimmer;
   a controller connected to the lighting control board and configured to input a command to the lighting control board, and;
   a surface portion configured to receive an insert for in-wall mounting of the lighting dimmer.

2. The lighting dimmer of claim 1 wherein the main body defines a compartment therein for receiving the lighting control board.

3. The lighting dimmer of claim 1, wherein the surface portion comprises a recessed vertically oriented portion of a face of the lighting dimmer.

4. The lighting dimmer of claim 1, further comprising the insert for in-wall mounting of the lighting dimmer received on the surface portion.

5. The lighting dimmer of claim 4, the insert defining an opening for receiving the controller.

6. The lighting dimmer of claim 1, wherein the controller is a rotary shaft.

7. The lighting dimmer of claim 1, further comprising a knob connected to the controller.

8. The lighting dimmer of claim 1, further comprising:
   the insert for in-wall mounting of the lighting dimmer, the insert having an opening defined therein and the opening positioned to receive a portion of the controller therethrough; and
   a knob configured to connect to the controller and retain the insert on the main body.

9. The lighting dimmer of claim 1, the main body configured to fit within a standard size electrical box.

10. The lighting dimmer of claim 1, the main body configured to fit within a 48 mm wide and 75 mm tall box.

11. A method of converting a lighting dimmer between an in-wall configuration and a surface mount configuration, comprising:
    removing a control knob of the lighting dimmer from connection with the lighting dimmer;
    selectively adding or removing a faceplate to a surface of the lighting dimmer; and
    replacing the control knob of the lighting dimmer in connection with the lighting dimmer.

\* \* \* \* \*